(12) United States Patent
Anderson et al.

(10) Patent No.: US 6,294,259 B1
(45) Date of Patent: Sep. 25, 2001

(54) POLYIMIDE HYBRID ADHESIVES

(75) Inventors: Gregory J. Anderson, Stillwater, MN (US); Scott B. Charles, Hudson, WI (US); Michael A. Kropp, Cottage Grove, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/611,450

(22) Filed: Jul. 6, 2000

(51) Int. Cl.$^7$ .................................................. B32B 27/38

(52) U.S. Cl. .................... 428/413; 523/455; 523/461; 525/533

(58) Field of Search .................... 523/455, 461; 428/413; 525/533; 528/94, 99, 100, 112, 120

(56) References Cited

U.S. PATENT DOCUMENTS

| | | |
|---|---|---|
| 3,989,670 | 11/1976 | Takekoshi et al. . |
| 4,004,061 | 1/1977 | Creighton et al. . |
| 4,035,345 | 7/1977 | Ducloux et al. . |
| 4,073,773 | 2/1978 | Banucci et al. . |
| 4,217,389 | 8/1980 | Peterson . |
| 4,410,664 | 10/1983 | Lee . |
| 4,416,973 | 11/1983 | Goff . |
| 4,443,591 | 4/1984 | Schmidt et al. . |
| 4,443,592 | 4/1984 | Schmidt et al. . |
| 4,547,455 | 10/1985 | Hiramoto et al. . |
| 4,585,852 | 4/1986 | Lo et al. . |
| 4,604,230 | 8/1986 | Goswami et al. . |
| 4,611,048 | 9/1986 | Peters . |
| 4,736,015 | 4/1988 | Rabilloud et al. . |
| 4,757,150 | 7/1988 | Guggenheim et al. . |
| 4,769,476 | 9/1988 | Howson . |
| 4,820,779 | 4/1989 | Schoenberg . |
| 4,835,249 | 5/1989 | Gallagher et al. . |
| 4,996,268 | 2/1991 | Schoenberg . |
| 5,006,611 | 4/1991 | Schmid et al. . |
| 5,028,681 | 7/1991 | Peters . |
| 5,108,825 | 4/1992 | Wojnarowski et al. . |
| 5,135,990 | 8/1992 | Bookbinder et al. . |

(List continued on next page.)

FOREIGN PATENT DOCUMENTS

| | | |
|---|---|---|
| 0 309 190 | 3/1989 | (EP) . |
| 0 379 131 | 7/1990 | (EP) . |
| 0 379 467 | 7/1990 | (EP) . |
| 54-64597 | 5/1979 | (JP) . |
| 56-76591 | 6/1981 | (JP) . |
| 61 270852 | 12/1986 | (JP) . |
| 63-75034 | 4/1988 | (JP) . |
| 6-60230 | 8/1994 | (JP) . |
| 6-62737 | 8/1994 | (JP) . |
| WO 97/47689 | 12/1997 | (WO) . |

OTHER PUBLICATIONS

Wu H et al: "Investigation of Readily Processable Thermoplastic–Toughened Thermosets. II. Epoxy Toughened Using a Reactive Solvent Approach" Jounral of Applied Polymer Science, US, John Wiley and Sons Inc., New York, vol. 70, No. 5, Oct. 31, 1998, pp. 935–942, XP000822796 Issn: 0021–8995, pp. 935–942.

Cui J. et al: "Studies on the Phase Separation of Polyetherimide–Modified Epoxy Resin, 3A. Morphology Development of the Blend During Curing" Macromolecular Chemistry and Physics, De, Wiley VCH, Weinheim, vol. 199, No. 8, Aug. 1, 1998, Issn: 1022–1352, pp. 1645–1649.

*Polymer,* "The toughening of epoxy resins with thermoplastics: 1. Trifunctional epoxy resin–polyetherimide blends," by D.J. Hourston and J. M. Lane, pp. 1379–1383, vol. 33, No. 7, 1992.

*Polymer,* "Toughening tetrafunctional epoxy resins using polyetherimide," by Clive B. Bucknall and Adrian H. Gilbert, pp. 213–217, vol. 30, Feb., 1989.

*Polymer Journal,* "Polyetherimide–Modified High Performance Epoxy Resin," by Jyongsik Jang and Weon Lee, vol. 26, No. 5, pp. 513–525 (1994).

*Journal of Applied Polymer Science,* "Investigation of Readily Processable, Thermoplastic–Toughened Thermosets, III. Toughening BMIs and Epoxy with a Comb–Shaped Imide Oligomer," by A. Gopala, J. Wu, P. Heiden, vol. 70, pp. 943–951 (1998).

(List continued on next page.)

Primary Examiner—Robert Dawson
Assistant Examiner—D. Aylward
(74) Attorney, Agent, or Firm—Scott R. Pribnow

(57) ABSTRACT

This invention relates to a polyimide hybrid adhesive comprised of an epoxy component, an epoxy curing agent, and a polyimide oligomer of molecular weight of up to about 8,000 ($M_n$) having repeating units of Formula (1):

The adhesives are particularly useful in applications where thermal stability and high adhesive strength are required.

25 Claims, No Drawings

U.S. PATENT DOCUMENTS

| | | |
|---|---|---|
| 5,147,943 | 9/1992 | Inoue et al. . |
| 5,169,911 | 12/1992 | Lupinski et al. . |
| 5,250,228 | 10/1993 | Baigrie et al. . |
| 5,252,700 | 10/1993 | Okikawa et al. . |
| 5,412,065 | 5/1995 | Amone et al. . |
| 5,462,996 | 10/1995 | Portelli et al. . |
| 5,470,920 | 11/1995 | Camberlin et al. . |
| 5,476,908 | 12/1995 | Kishi et al. . |
| 5,606,014 | 2/1997 | Connell et al. . |
| 5,800,575 | 9/1998 | Lucas . |
| 5,863,817 | 1/1999 | Murakami et al. . |
| 5,883,182 | 3/1999 | Hunt . |

OTHER PUBLICATIONS

"Synthesis and Characterization of Hydroxyl Terminated Oxydiphthalic Anhyrdride–Bis–Aniline P. Soluble, Fully Cyclized Polyimides," by P. Lakshmanan, S. Srinivasan, T. Moy and J.E. McGrath, pp. 442–443, 1993.

*Die Angewandte Makromolekulare Chemie*, "Preparation of prepolymers from diglycidylether of Bisphenol A containing imide groups," by Virginia Cadiz, Ana Mantecon, Angels Serra, Christophe Thepaut, vol. 195 (1992) pp. 129–137 (Nr. 3365).

*High Perform. Polym*, "Toughening of epoxy resins by polyimides synthesized from bisanilines," by J.N. Hay, B. Woodfine and M. Davies, vol. 8 (1996) pp. 35–56.

*Polymer Preprints*, "Toughening of Epoxy Resins by Polyimides Derived from Bisanilines," by Martin Davies, John N. Hay and Barry Woodfine, vol. 35 American Chemical Society, pp. 357–358, Mar. 1994.

"Synthesis, Characterization, and Thermal Behaviour of New Epoxy Polyesterimides," *Die Angewandte Makromolekulare Chemii*, vol. 133 (1985) pp. 97–109 (Nr. 2136).

"Polyimide–Epoxy Composites," *Advances in Polymer Science*, vol. 140, pp. 108–136, 1999.

*Journal of Organic Chemistry of the USSR*, "Synthesis of New Aromatic Tetracarboxylic Dianhydrides," M. M. Koton, F. S. Florinski, Zh. Org Khin., pp. 754–756, vol. 4, No. 8, Aug. 1968.

*Journal of Applied Polymer Science*, "Investigation of Readily Processable Thermoplastic–Toughened Thermosets," Gopala et al., vol. 69, pp. 469–477 (1998).

Japan Chemical Week, Sep. 9, 1999, p. 3.

POLYIMIDE HYBRID ADHESIVES

FIELD OF THE INVENTION

The present invention relates to a polyimide hybrid adhesive comprised of an epoxy resin, an epoxy curing agent, and a polyimide oligomer of molecular weight up to about 8,000 grams/mole ($M_n$) having a backbone that is unreactive with an epoxy resin. The polyimide oligomer may, optionally, be terminated by one or more functional groups that are reactive with an epoxy resin.

BACKGROUND OF THE INVENTION

Epoxy resins have found a wide range of uses in many industries since their commercial introduction. Industries in which epoxy resins are utilized as adhesives and coatings include the construction and electronics industries. Cured epoxy resins are noted for their low shrinkage, lasting adhesion, high dielectric strength, and chemical resistance. A major limitation of epoxy resins, particularly those intended for high temperature applications, is their inherent brittleness arising from their crosslinked structure. It is documented that development of approaches to toughening epoxy resins without sacrificing modulus and lowering the glass transition temperature ($T_g$) would lead to an expansion of their use in areas such as primary aircraft structures, molding compounds and electrical and electronic components.

Methods for increasing toughness of epoxy adhesives are desired. In applications in the electronics industry, however, compositions that also maintain good thermal stability and adhesion to a wide variety of substrates are desirable.

SUMMARY OF THE INVENTION

One method for toughening epoxy adhesives involves the incorporation of thermoplastic toughening agents into epoxy resins. Polyimides are examples of thermoplastic resins that may be used for toughening epoxies. The resulting epoxy-polyimide adhesives are defined as polyimide "hybrids." Polyimides are synthetic organic resins characterized by repeating imide linkages in the polymer chain. They are noted for their outstanding chemical and physical properties, particularly their high temperature oxidative stability and strength. However, most conventional polyimides, especially aromatic polyimides, are extremely difficult to process due to their high softening points, as well as their insolubility in organic solvents.

It is desirable to add these polyimide resins to epoxy resins in amounts great enough to maximize the toughness of the resulting polyimide hybrid adhesive composition. For many applications, however, it is desirable to also maintain low viscosity in the adhesive composition so that it may be hot-melt processed into useful adhesive films. Therefore, according to the present invention, polyimide is incorporated into an epoxy adhesive composition in the amount of preferably about 5% to about 60%, more preferably about 20% to about 40% by weight, based on total weight of the adhesive composition, to provide enhanced physical properties (such as a high glass transition temperature, $T_g$) while maintaining a viscosity that is low enough to allow hot-melt processing of these adhesives.

Polyimide hybrid adhesives of the invention also have many advantages associated with cure thereof. Polyimide hybrid adhesives of the invention may be cured with a controlled rapid cure. "Controlled rapid cure" means being able to obtain rapid onset of cure utilizing thermal or photonic energy input. Controlled rapid cure allows rapid part assembly. Polyimide hybrid adhesives of the invention are also able to be cured at low temperatures. Low curing temperatures are also desirable because this allows these adhesive systems to be utilized in a wider variety of applications. In addition, minimizing thermal input helps save energy when these adhesives are used in assembly operations.

Polyimide hybrid adhesives of the invention are also able to be processed in an essentially solvent-free manner. Solvent-free polyimide hybrid adhesives are desirable as they minimize worker exposure to organic vapors and significantly reduce the risk of fire and explosion. These solvent-free polyimide hybrid systems also contribute significantly to compliance with stringent air quality standards.

Furthermore, when processing polyimide hybrid adhesives of the invention according to the preferred solvent-free manner (e.g., by hot-melt processing), residual solvent in the processed adhesive is eliminated, or at least reduced. Residual solvent in polyimide/epoxy adhesives may create bubbles in adhesive bonds (i.e., "popcorning"). Such popcorning may contribute to adhesive failure and/or corrosion of electronic components. Solvent-free processing according to the invention eliminates the need for resource-consuming solvent removal steps.

DETAILED DESCRIPTION OF THE PREFERRED EMBODIMENTS

The present invention is comprised of a thermosettable blended polyimide hybrid adhesive composition comprising a polyimide oligomer, preferably a polyetherimide oligomer, having a molecular weight of less than about 8,000 grams/mole ($M_n$) and containing a repeating backbone unit of the Formula (I):

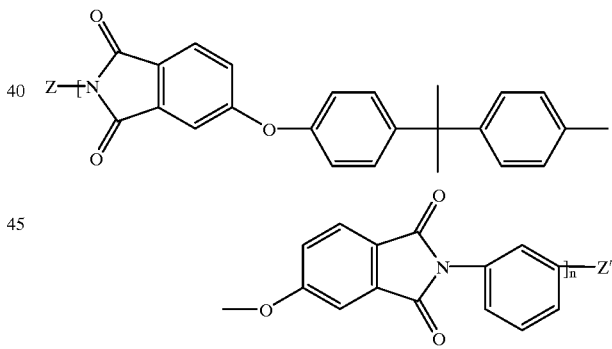

where terminal end group Z is selected from:

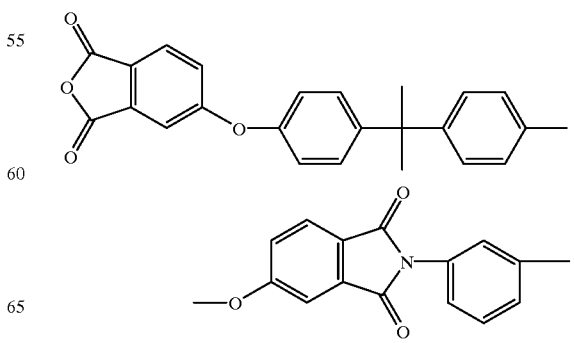

-continued

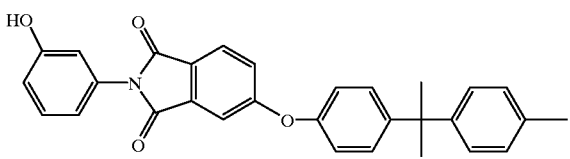

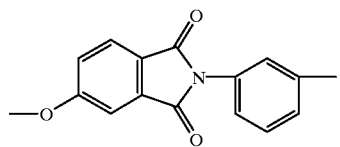

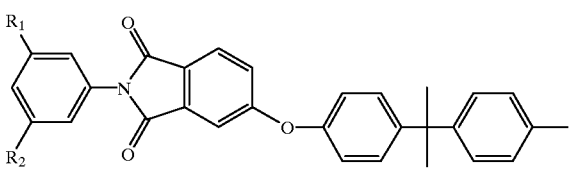

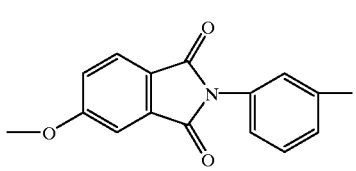

and where terminal end group Z' is selected from:

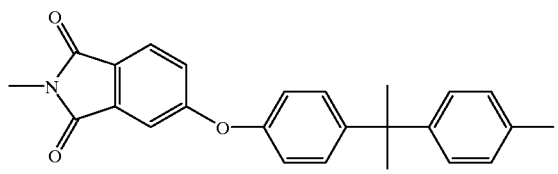

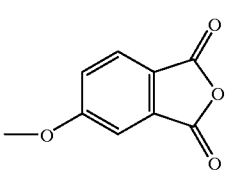

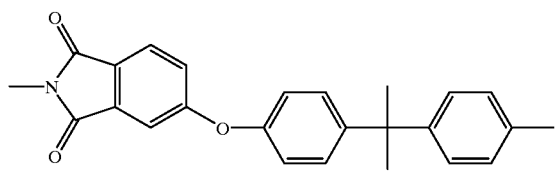

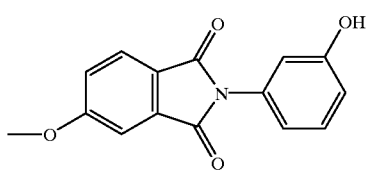

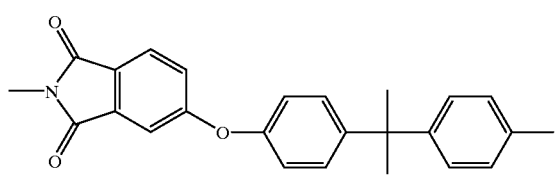

-continued

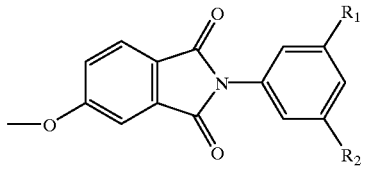

$R_1$ and $R_2$ are independently selected from hydrogen, halogens, alkyls having about 1–12 carbon atoms, alkoxys having about 1–12 carbon atoms, and aminos. As can be seen from the above chemical structures, the terminal end groups may, optionally, contain one or more functional groups that are reactive with an epoxy resin. An epoxy resin and an epoxy curing agent are also included in this polyimide hybrid adhesive composition.

The number average molecular weight ($M_n$) of the polyimide oligomer is less than about 8,000 grams/mole. This requires that n in Formula I be controlled to a range of about 3 to about 6, on average, in the oligomer backbone.

The compositions are thermosettable. A "thermosettable" or "thermosetting" composition is one which can be cured (i.e., crosslinked), for example by exposure to, preferably, thermal radiation, actinic radiation, moisture, or other means, to yield a substantially infusible (i.e., thermoset) material. Combinations of various curing means may also be used (e.g., a combination of heat and actinic radiation).

This polyimide hybrid adhesive composition may be solvent-free and can be manufactured and applied in a hot-melt process utilizing melt processing of the adhesive components. The adhesive compositions of the present invention are particularly useful in applications that require heat resistance such as laminating adhesives, flip chip adhesives, anisotropic conductive adhesives, covercoats, and encapsulants for electronic components in the electronics industry.

The polyimide oligomer useful in the present invention may be synthesized by reacting 2,2'-bis[4-(2,3 dicarboxylphenoxy)phenyl]propane dianhydride with phenylenediamine. A solvent-free method for manufacturing these polyimide oligomers is disclosed in U.S. Pat. No. 4,585,852 to Lo et al., wherein the process involves (a) extruding a first mixture of an organic diamine and an aromatic bis(ether anhydride) under melt polymerization conditions to form a low molecular weight, anhydride-terminated polymer, wherein the first mixture contains a molar excess of the bis(ether anhydride).

The anhydride-terminated polymer of step (a) may be optionally reacted in a step (b) by extruding a second mixture of the low molecular weight anhydride-terminated polymer of step (a) with a stoichiometrically sufficient amount of aniline moiety, or functionalized aniline moiety, under melt polymerization conditions such that this anhydride-terminated polymer becomes terminated with functional groups, which functional groups may optionally be reactive with epoxy groups. For example, the reaction of step (b) may be done by reacting the terminal anhydride groups of the polymer formed in step (a) with 3-aminophenol, m-phenylenediamine, or a phenylamine moiety having two additional groups, $R_1$ and $R_2$, substituted on the phenyl ring. $R_1$ and $R_2$ are independently selected from hydrogen, halogens, aminos, alkyls having about 1–12 carbon atoms, and alkoxys having about 1–12 carbon atoms. Alternatively, the polymerization could be conducted batchwise in a reactor.

Polyimide oligomers formed in step (a) may also be prepared from other monomers. Other dianhydrides that may be used include, for example, 2,2-bis[4-(2,3-dicarboxyphenoxy)phenyl]propane dianhydride;
4,4'-bis(2,3-dicarboxyphenoxy)diphenyl ether dianhydride;
1,3-bis(2,3-dicarboxyphenoxy)benzene dianhydride;
4,4'-bis(2,3-dicarboxyphenoxy)diphenyl sulfide dianhydride;
1,4-bis(2,3-dicarboxyphenoxy)benzene dianhydride;
4,4'-bis(2,3-dicarboxyphenoxy)benzophenone dianhydride;
4,4'-bis(2,3-dicarboxyphenoxy)diphenyl sulfone dianhydride;
2,2-bis[4-(3,4-dicarboxyphenoxy)phenyl]propane dianhydride;
4,4'-bis(3,4-dicarboxyphenoxy)diphenyl ether dianhydride;
4,4'-bis(3,4-dicarboxyphenoxy)diphenyl sulfide dianhydride;
1,3-bis(3,4-dicarboxyphenoxy)benzene dianhydride;
1,4-bis(3,4-dicarboxyphenoxy)benzene dianhydride;
4,4-bis(3,4-dicarboxyphenoxy)benzophenone dianhydride;
4-(2,3-dicarboxyphenoxy)-4'-(3,4-dicarboxyphenoxy) diphenyl-2,2-propane dianhydride;
and the like and mixtures of such bis(ether anhydride)s.

Additional aromatic bis(ether anhydride)s are described by Koton, M. M.; Florinski, F. S.; Bessonov, M. I.; Rudakov, A P. (Institute of Heteroorganic Compounds, Academy of Sciences, USSR) USSR No. 257,010, Nov. 11, 1969, Appln. May 3, 1967, and by M. M. Koton, F. S. Florinski, Zh. Org Khin., 4 (5) 774 (1968). Bis(ether anhydride)s that are preferred for use in the method of this invention are:
2,2-bis[4-(2,3-dicarboxyphenoxy)phenyl]propane dianhydride;
2,2-bis[4-(3,4-dicarboxyphenoxy)phenyl]propane dianhydride;
4-(2,3-dicarboxyphenoxy)-4'-(3,4-dicarboxyphenoxy) diphenyl-2,2-propane dianhydride;
and mixtures thereof.

Organic diamines used in the process of this invention are generally described above and include, for example, m-phenylenediamine; p-phenylenediamine; 4,4'-diaminodiphenylpropane; 4',4'-diaminodiphenylmethane(4,4'-methylenedianiline); bendzidine; 4,4'-diaminodiphenyl sulfide; 4,4'-diaminodiphenyl sulfone; 4,4'-diaminodiphenyl ether(4,4'-oxydianiline); 1,5-diaminonaphthalene; 3,3'-dimethylbenzidine; 3,3'-dimethoxybenzidine; 2,4-bis(.beta.-amino-t-butyl)toluene; bis(p-beta-amino-t-butylphenyl) ether; bis(p-beta-methyl-o-aminopentyl)benzene; 1,3-diamino4-isopropylbenzene; 1,2-bis(3-aminopropoxy) ethane; m-xylylenediamine; p-xylylenediamine; 2,4-diaminotoluene; 2,6-diaminotoluene; bis(4-aminocyclohexyl)methane; 3-methylheptamethylenediamine; 4,4-dimethylheptamethylenediamine; 2,11-dodecanediamine; 2,2-dimethylpropylenediamine; octamethylenediamine; 3-methoxyhexamethylenediamine; 2,5-dimethylhexamethylenediamine; 2,5-dimethylheptamethylenediamine; 3-methylheptamethylenediamine; 5-methylnonamethylenediamine; 1,4-cyclohexanediamine; 1,12-octadecanediamine; bis(3-aminopropyl)sulfide ; N-methyl-bis(3-aminopropyl)amine; hexamethylenediamine; heptamethylenediamine; nonamethylenediamine; decamethylenediamine; bis(3-aminopropyl) tetramethyldisiloxane; bis(4-aminobutyl) tetramethyldisiloxane; and the like and mixtures of such diamines.

In a preferred method of forming the polyimide hybrid adhesive composition, the polyimide oligomer is combined with the epoxy resins in a solvent-free process, wherein the polyimide oligomers are mixed with the epoxy resin and the resultant mixture is heated and stirred until a homogenous mixture is formed. The polyimide oligomer may be added in a concentration of about 5 to about 60 weight percent based on total weight of the adhesive composition. A preferred amount of the polyimide oligomer is a concentration of about 20 to about 40 weight percent based on total weight of the composition.

The epoxy resins useful herein may be, for example, substituted or unsubstituted aliphatic, cycloaliphatic, aromatic and/or heterocyclic polyepoxides, such as glycidyl esters, glycidyl ethers, glycidyl amines, or epoxidized olefins. When substituted, they may be substituted, for example, with non-interfering substituents such as halogen, hydroxyl, and other groups.

The epoxy resins are preferably ionically clean in that they are substantially free of ionic species. Removal of residual ionic halogens can be accomplished by reacting the epoxy resin with potassium hydroxide, sodium hydroxide, or any other suitable base.

When using an anhydride curing agent, it is also preferable to use a purified epoxy resin. By purifying the epoxy resin, such as by using the method described for preparing the "Purified EPON RESIN 828" in the Examples, infra, the polyimide hybrid adhesives are capable of having even further improved thermal stability. The purification process helps to remove impurities, such as higher molecular weight oligomers containing hydroxyl groups.

In order to facilitate low temperature processing, curing agents such as thermally and photolytically active catalysts may be incorporated into the polyimide hybrid adhesive. These curing agents are incorporated into the polyimide hybrid adhesive compositions at temperatures lower than the activation temperature of these curing agents. These curing agents are preferably anhydride curing agents, hydrazide curing agents, thermal cationic catalysts, or anionic catalysts or photocatalysts.

In a preferred method of manufacture, the polyimide hybrid adhesive is formed by dissolving the polyimide oligomers into the epoxy resin at elevated temperatures and then cooling the solution to a temperature below the activation temperature of the curing agent. Then, the curing agent can be blended into the solution. In preferred methods, the polyimide oligomer is dissolved in the epoxy resin at a temperature greater than about 120° C. with subsequent cooling to below about 120° C., preferably below about 100° C., to add the curing agent.

While not wishing to be bound by theory, the uncured polyimide hybrid adhesives disclosed in this invention are believed to be principally mixtures of the epoxy resins and polyimide oligomers without B-staging of the polyimide oligomer and epoxy resins. Thus, viscosity of the polyimide hybrid adhesive is minimized before cure. Solvent-free application of these polyimide hybrid adhesives may be accomplished by melting these compositions at temperatures below the activation temperatures of the curing agent and applying the polyimide hybrid adhesive composition to a substrate.

As noted, adhesive compositions of the invention find application in the electronics industry, so it is desirable to enhance the structural integrity and electrical conductivity of these adhesives for such applications. Additives to increase the structural integrity of these adhesives such as reinforcing fillers including silica, calcium carbonate, barium sulphate, glass beads, and the like are used. Fillers to increase electrical conductivity can include metallic powders such as silver, copper and aluminum powders, or metallic-coated glass beads and mineral fillers, or any other electrically conductive component used as a filler in electrically conductive materials.

EXAMPLES

In the Examples below, the following abbreviations, materials, and equipment used are defined as follows:

"° C" means degrees Celsius;

"AMICURE CG-1400" is a trade designation for a micronized dicyandiamide catalyst, available from Air Products Corporation of Allentown, Pa., USA;

"BRABENDER" mixer refers to a BRABENDER PREP CENTER, a high-torque, heated mixing apparatus available from C.W. Brabender Instruments, Incorporated, South Hackensack, N.J., USA;

"meso-Butane-1,2,3,4-tetracarboxylic dianhydride" is available from TCI America of Portland, Oreg., USA;

"CGI 7460" is a trade designation for an organic borate photoinitiator available from Ciba Specialty Chemicals Additives Division of Tarrytown, N.Y., USA;

"CUREZOL 2MZ-AZINE CURING AGENT" is a trade designation for an imidazole-based curing agent for epoxy resins available from Air Products and Chemicals, Incorporated of Allentown, Pa., USA;

"DEN 431" is a trade designation for epoxy-novolac resin, available from Dow Chemical Company of Midland, Mich., USA;

"5-(2,5-Dioxotetrahydrofuryl)-3-methyl-3-cyclohexene-1,2-dicarboxylic anhydride" is available from Chriskev Company, Inc. of Shawnee Mission, Kans., USA;

"4,5-diphenylimidazole" is available from Aldrich Chemical Company of Milwaukee, Wis., USA;

"Dynamic Mechanical Analysis" (i.e., "DMA") was performed using a RHEOMETRICS RDA2 thermal analyzer available from Rheometric Scientific, Incorporated of Piscataway, N.J., USA, equipped with 8-millimeter parallel plates. For testing, each sample was die-cut and placed in the fixture at 25° C. Dynamic temperature step testing was performed at one Hertz and 0.1% strain using 3° C. steps with a 30-second step interval. The temperature was stepped from 0° C. to 100° C.;

"EPON RESIN 164" (also referred to as "EPIKOTE 180") is a trade designation for a solid, multifunctional epichlorohydrin/cresol novolac epoxy resin available from Shell Chemical Company of Houston, Tex., USA;

"EPON RESIN 828" is a trade designation for a bisphenol A/epichlorohydrin-based epoxy resin available from Shell Chemical Company of Houston, Tex., USA;

"EPOXY RESEARCH RESIN RSL-1462" is a trade designation for a bisphenol A/epichlorohydrin-based epoxy resin having residual levels of epichlorohydrin of less than 1 part per million by weight, and available from Shell Chemical Company of Houston, Tex., USA;

"FR 406 LAMINATE" is a trade designation for an epoxy based multilayered substrate used for circuit board fabrication, available from Allied-Signal Laminate Systems of LaCrosse, Wis., USA;

"INTELIMER POLYMER 6100" is a trade designation for a cobalt naphthenate curing agent in an alkyl acrylate polymer carrier, available from Landec Corporation of Menlo Park, Calif., USA;

"Isophthalic hydrazide" is available from TCI America of Portland, Oreg., USA;

"Purified EPON RESIN 828" was prepared according to the following procedure: A three-neck, round-bottom flask equipped with a mechanical stirrer, nitrogen inlet, and temperature probe was used. First, 500 parts of EPON RESIN 828 (689 parts per million by weight hydrolyzable chloride) was added to the flask and heated to 70° C. A premix of 1.5 parts of 85% potassium hydroxide in 1.5 parts of water was added to the EPON RESIN 828, with mixing. The mixture was heated for four hours, after which dry ice was added and mixing continued for 30 minutes. The mixture was then cooled to room temperature, yielding a crude product. The crude product was distilled on a rolled film evaporator at 185° C. and 0.001 Torr to give 224 parts of a colorless material. Analysis showed that hydrolyzable chloride in the material was reduced to 2.2 parts per million by weight as determined according to ASTM Method D 1726-90, "Standard Test Methods for Hydrolyzable Chloride Content of Liquid Epoxy Resins", (Test Method B);

"RHODORSIL PHOTOINITIATOR 2074" is a trade designation for [(1-methylethyl)phenyl](methylphenyl) iodonium tetrakis(pentafluorophenyl)borate, available from Rhodia, Incorporated of Cranbury, N.J., USA;

"SILSTAR LE-05" is a trade designation for fused silica particles (having a median particle size of 4.5 micrometers), available from Nippon Chemical Industrial Company of Tokyo, Japan;

"ULTEM 1010-1000" is a trade designation for polyimide having a number average molecular weight ($M_n$) of approximately 22,000 grams/mole obtained from GE Plastics of Mt. Vernon, Ind., USA;

"ULTEM oligomer 1" refers to dianhydride-rich (23 percent stoichiometric excess dianhydride) oligomers of polyimide having a $M_n$ of approximately 2,800 grams/mole obtained from GE Plastics of Mt. Vernon, Ind., USA;

"ULTEM oligomer 2" refers to dianhydride-rich (12.75 percent stoichiometric excess dianhydride) oligomers of polyimide having a $M_n$ of approximately 7,900 grams/mole obtained from GE Plastics of Mt. Vernon, Ind., USA; and "ULTEM oligomer 3" refers to an amine-terminated oligomer of polyimide having a $M_n$ of approximately 2,800 grams/mole obtained from GE Plastics of Mt. Vernon, Ind., USA.

Example 1

This Example shows the preparation of anhydride-terminated polyimide oligomer/epoxy blend films containing latent photocatalyst. ULTEM oligomer 1 (9.0 grams) was hand mixed with EPOXY RESEARCH RESIN RSL-1462 (20.7 grams) in a glass jar. The jar was heated in a forced air oven at approximately 177° C. for fifteen minutes with mixing about every five minutes. The resultant solution was an amber, translucent material. The jar was removed from the oven and allowed to cool to approximately 121° C. RHODORSIL 2074 (0.3 gram) was added to the solution and hand mixed with the reaction material until homogeneous.

The homogenous mixture was hot knife-coated between two layers of release liner using a knife temperature of 70° C. and a bed temperature of 70° C. Unless otherwise specified, coated layers containing ULTEM oligomer 1 appearing in the following Examples were of 0.13-millimeter film thickness.

Example 2

This Example shows the preparation of anhydride-terminated polyimide oligomer/epoxy blend films containing latent photocatalyst. ULTEM oligomer 2 (9.0 grams) was hand mixed with EPOXY RESEARCH RESIN RSL-1462 (20.7 grams) in a glass jar. The jar was heated in a forced air oven at approximately 177° C. for fifteen minutes with mixing about every five minutes. The resultant solution was an amber, translucent material. The jar was removed from the oven and allowed to cool to approximately 121° C. RHODORSIL 2074 (0.3 grams) was added to the jar and hand mixed with the reaction material until homogeneous. The reaction material was hot knife-coated at 0.13 millimeter thickness between two layers of release liner using a knife temperature of 70° C. and a bed temperature of 70° C.

Example 3

This Example shows the preparation of anhydride-terminated polyimide oligomer/epoxy/anhydride blend films containing a latent photocatalyst. ULTEM oligomer 1 (6.9 grams) was hand mixed with EPOXY RESEARCH RESIN RSL-1462 (12.0 grams) in a glass jar. The jar was heated in a forced air oven at approximately 177° C. for 25 minutes with mixing about every five minutes. The resultant solution was an amber, translucent material. The jar was removed from the oven and allowed to cool to approximately 121° C. 4-methylphthalic anhydride (8.7 grams) was added to the jar and hand mixed with the reaction material. The jar was heated at approximately 121° C. for fifteen minutes with mixing about every five minutes. The reaction material was an amber, translucent material. CGI 7460 (0.3 grams) was added to the jar and hand mixed with the reaction material until homogeneous. The reaction material at 0.13-millimeter thickness was hot knife-coated between two layers of release liner with a knife temperature of 70° C. and a bed temperature of 70° C. The film became milky white with cooling.

Example 4

This Example shows the preparation of anhydride-terminated polyimide oligomer/epoxy blend films containing a latent photocatalyst. DEN 431 (7.5 grams) and EPON RESIN 164 (7.5 grams) were combined in a glass jar then heated in a forced air oven at approximately 177° C. for ten minutes yielding a clear, translucent material. ULTEM oligomer 1 (5.0 grams) was hand mixed with the epoxy resins. The jar was heated at approximately 177° C. for 20 minutes with mixing about every five minutes to give an amber, translucent solution. The jar was removed from the oven and allowed to cool to approximately 121° C. RHODORSIL 2074 (0.2 gram) was added to the tin and hand mixed with the reaction material until homogeneous. The reaction material was hot knife-coated at 0.13-millimeter thickness between two layers of release liner with a knife temperature of 70° C. and a bed temperature of 70° C.

Example 5

This Example describes the preparation of aniline end-capped polyimide oligomer. ULTEM oligomer 1 (100.0 grams), aniline (15 milliliters), and o-xylene (30 milliliters) were dissolved in 750-milliliter dimethylacetamide in a one-liter reaction flask under a strong nitrogen purge. The reaction flask was fitted with a thermometer, mechanical stirrer and DEAN-STARK-type water removal trap. The reaction temperature was raised to 164° C. and held at that temperature while all water released from the reaction was removed. The product was isolated in and washed with copious amounts of methanol. The product was then dried in a vacuum oven at 150° C. until no residual solvent was observed by $^1$H NMR spectroscopy. The resulting oligomer had a number average molecular weight ($M_n$) of approximately 2,940 grams/mole.

Example 6

This Example describes the preparation of 3-aminophenol end-capped polyimide oligomer. The procedure for Example 5 was repeated with the exception that 3-aminophenol (15 milliliters) replaced aniline.

Example 7

This Example shows the preparation of anhydride-terminated polyimide oligomer/epoxy blend films containing filler and a latent photocatalyst (cationic cure system). ULTEM oligomer 1 (9.0 grams) was hand mixed with RSL 1462 (20.7 grams) in a glass jar. The jar was heated in a forced air oven at approximately 177° C. for fifteen minutes with mixing about every five minutes resulting in an amber, translucent material. The jar was air cooled to approximately 125° C., then placed in an approximately 125° C. oil bath. The mixture was stirred with an air-driven mechanical stirrer. LEO5 filler (55.7 grams) was slowly added to the mixture. RHODORSIL 2074 (0.3 gram) was combined with fifteen grams LE05 and added with stirring to the mixture. The reaction material was hot knife-coated between two layers of release liner with a knife temperature of 70° C. and a bed temperature of 70° C.

Example 8

This Example shows the preparation of anhydride-terminated polyimide/epoxy blend films containing a bisphenol-A epoxy resin and an epoxy-novolac resin with an imidazole (anionic cure system). RSL 1462 (6.0 grams) and EPON RESIN 164 (1.5 grams) were combined in a glass jar, then heated at approximately 177° C. for five minutes yielding a clear, homogeneous melt. ULTEM oligomer 1 (2.5 grams) was added to the jar and the heating resumed at approximately 177° C. for 30 minutes with frequent stirring resulting in an amber, translucent material. The jar was air cooled to 120° C. CUREZOL 2MZ-AZINE CURING AGENT (0.45 gram) was then added to the reaction material. The reaction material was hot knife-coated between two layers of release liner with a knife temperature of 70° C. and a bed temperature of 70° C.

Example 9

This Example shows the preparation of aniline-terminated polyimide oligomer/epoxy blend films containing photocatalyst (cationic cure system). Aniline-terminated polyimide oligomer (9.0 grams, from Example 5) was hand mixed with EPOXY RESEARCH RESIN RSL-1462 (20.7 grams) in a glass jar. The jar was heated in a forced air oven at approximately 177° C. for fifteen minutes with mixing about every five minutes. The resultant solution was an amber, translucent material. The jar was removed from the oven and allowed to cool to approximately 121° C. RHODORSIL 2074 (0.3 gram) was added to the jar and hand mixed with the reaction material until homogeneous. The reaction material was hot knife-coated at 0.13 millimeter between two layers of release liner with a knife temperature of 70° C. and a bed temperature of 70° C.

Example 10 (Comparative)

This Example shows the preparation of an epoxy/high molecular weight polyimide solution. ULTEM 1010-1000 was dried at approximately 170° C. in a vacuum oven for 36 hours and EPOXY RESEARCH RESIN RSL-1462 was dried at 80° C. in a vacuum oven for 36 hours to remove moisture. ULTEM 1010-1000 (40 grams) was placed in a 500-milliliter reactor and 160 grams EPOXY RESEARCH RESIN RSL-1462 was added using a mechanical stirrer. The reactor was heated in an oil bath to 200° C. with a five to ten milliliter per minute dry nitrogen purge. The ULTEM was completely dissolved into the EPOXY RESEARCH RESIN RSL-1462 in 6 hours to give a solution containing 20 weight percent ULTEM 1010-1000. This solution was poured into a TEFLON-coated tray (TEFLON is a registered trademark of E.I. du Pont de Nemours and Co. of Wilmington, Del., USA), which solidified upon cooling.

In order to mix the initiator uniformly with epoxy/ULTEM solutions, initiator was dissolved into epoxy resin to make a ten weight percent solution. This ten weight percent solution was mixed with epoxy/ULTEM solutions to form uncured hybrids containing one weight percent catalyst. For example, 30 grams epoxy/ULTEM solution, which contained 22 weight percent ULTEM 1010-1000 and 78 weight percent EPOXY RESEARCH RESIN RSL-1462, was placed in a 110° C. preheated BRABENDER mixer with 50 rpm rotation. After one minute, a mixture of 2.34 grams of ten weight percent RHODORSIL PHOTOINITIATOR 2074 in EPOXY RESEARCH RESIN RSL-1462 was added dropwise. This mixing process finished in fifteen minutes. The uncured mixture contained 20.5 weight percent ULTEM 1010-1000, 78.8 weight percent EPOXY RESEARCH RESIN RSL-1462, and 0.7 weight percent RHODORSIL PHOTOINITIATOR 2074 (i.e., one weight percent relative to EPOXY RESEARCH RESIN RSL-1462 content). This composition was processed as a lamination film or in other forms.

Example 11

This Example shows the preparation of amine-terminated polyimide oligomer/epoxy blend films containing a thermal curative. Amine-terminated polyimide oligomer (30.0 grams) was mixed with EPOXY RESEARCH RESIN RSL-1462 (70.0 grams) with a mechanical stirrer in a 100-milliliter reactor. The reactor was heated to 90° C. with an oil bath. After one hour, the resultant solution was an amber, translucent material. AMICURE CG-1400 (3.0 grams) was added to the reactor and mechanically mixed with the reaction material for five minutes. The reaction material was poured into a TEFLON-coated tray and allowed to cool.

Example 12

This Example shows the preparation of an anhydride-terminated polyimide/epoxy/dianhydride blend film containing latent catalyst. The dianhydride used in this Example dissolved in the epoxy resin at the blending temperature.

ULTEM oligomer 1 (5.5 grams) was hand mixed with purified EPON RESIN 828 (22.0 grams) in a glass jar. The jar was heated in a forced air oven at approximately 177° C. for 25 minutes with mixing about every five minutes, resulting in an amber, translucent material. 5-(2,5-Dioxotetrahydrofuryl)-3-methyl-3-cyclohexen-1,2-dicarboxylic anhydride (13.35 grams) was hand stirred in the reaction mixture. The jar was again heated in a forced air oven at approximately 177° C. for 30 minutes with mixing about every five minutes. The resultant material (27.5 grams) was fed into a BRABENDER mixer heated to 70° C. and operating at 50 rpm. SILSTAR LE-05 (51.1 grams) was slowly added over ten minutes. INTELIMER POLYMER 6100 was combined with fifteen grams of the filler and added to the blend. The blend was mixed for an additional five minutes, then removed from the mixer. The reaction material was hot knife-coated at 0.13-millimeter thickness between two layers of release liner with a knife temperature of 70° C. and a bed temperature of 70° C.

Example 13

This Example shows the preparation of an anhydride-terminated polyimide/epoxy/dianhydride blend films containing filler and latent catalyst. The dianhydride used in this Example did not dissolve in the epoxy resin at the blending temperature.

ULTEM oligomer 1 (3.75 grams) was hand mixed with EPOXY RESEARCH RESIN RSL-1462 (15.0 grams) in a glass jar. The jar was heated in a forced air oven at 177° C. for 25 minutes with mixing about every five minutes, resulting in an amber, translucent material. The resultant material (18.75 grams) was fed into a BRABENDER mixer heated to 70° C. Then, meso-butane-1,2,3,4-tetracarboxylic dianhydride (3.94 grams) was combined with SILSTAR LE-05 (42.1 grams) and INTELIMER POLYMER 6100 (1.1 grams) was slowly added to the reaction mixture in the mixer over ten minutes. The blend was mixed for an additional five minutes, then removed from the mixer. The reaction material was hot knife-coated at 0.13-millimeter thickness between two layers of release liner with a knife temperature of 70° C. and a bed temperature of 70° C.

Example 14

This Example shows the preparation of anhydride-terminated polyimide oligomer/epoxy/hydrazide blend films containing filler (hydrazide cure system). ULTEM oligomer 1 (3.75 grams) was hand mixed with EPOXY RESEARCH RESIN RSL-1462 (15.0 grams) in a glass jar. The jar was heated in a forced air oven at approximately 177° C. for 25 minutes with mixing about every five minutes resulting in an amber, translucent material. The resultant material (18.75 grams) was fed into a BRABENDER mixer heated to 70° C. Isophthalic hydrazide (4.10 grams) was combined with SILSTAR LE05 (42.5 grams), then slowly added to the reaction mixture over ten minutes. The blend was mixed for an additional five minutes, then removed from the mixer. The reaction material was hot knife-coated at 0.13-millimeter thickness between two layers of release liner with a knife temperature of 70° C. and a bed temperature of 70° C.

Example 15

This Example shows the preparation of anhydride-terminated polyimide oligomer/epoxy blend films containing filler and imidazole catalyst (anionic cure system). ULTEM oligomer 1 (9.0 grams) was hand mixed with EPOXY RESEARCH RESIN RSL-1462(20.7 grams) in a glass jar. The jar was heated in a forced air oven at approximately 177° C. for 25 minutes with mixing about every five minutes resulting in an amber, translucent material. The resultant material (29.7 grams) was fed into a BRABENDER mixer heated to 70° C. SILSTAR LE-05 filler (55.7 grams) was slowly added to the reaction mixture over ten minutes. 4,5-diphenylimidazole (1.5 grams) was combined with fifteen grams of SILSTAR LE-05 and added as the final additive to the blend. The blend was mixed for an additional five minutes, then removed from the mixer. The reaction material was hot knife-coated at 0.13-millimeter thickness between two layers of release liner with a knife temperature of 70° C. and a bed temperature of 70° C.

Example 16

This Example shows the effect of using polyimides having different viscosities and processing advantages achievable using compositions according to the present invention. Four samples were prepared as follows: Example 16a was a mixture of ULTEM oligomer 1 (30 weight percent) and EPOXY RESEARCH RESIN RSL-1462 (70 weight percent); Example 16b was aniline-capped ULTEM 1 (30 weight percent) and EPOXY RESEARCH RESIN RSL-1462 (70 weight percent); Example 16c was a mixture of ULTEM oligomer 2 (30 weight percent) and EPOXY RESEARCH RESIN RSL-1462 (70 weight percent); and Example 16d (comparative) was ULTEM 1010-1000 polymer (30 weight percent) and EPOXY RESEARCH RESIN RSL-1462 (70 weight percent) prepared as described in the first paragraph of Example 10 (comparative).

TABLE 1

Complex Viscosity Data (Poise)

| Approximate Temperature (° C.) | Example 16a (Actual ° C.) $M_n \approx 2{,}800$ grams/mole | Example 16b (Actual ° C.) $M_n \approx 2{,}940$ grams/mole | Example 16c (Actual ° C.) $M_n \approx 7{,}900$ grams/mole | Example 16d (Actual ° C.) $M_n \approx 22{,}000$ grams/mole |
|---|---|---|---|---|
| 25 | $8.34 \times 10^5$ (25.7) | $7.24 \times 10^5$ (25.7) | $1.89 \times 10^6$ (25.4) | $8.13 \times 10^5$ (26.0) |
| 50 | $4.67 \times 10^3$ (51.3) | $4.04 \times 10^3$ (51.5) | $1.12 \times 10^4$ (51.4) | $1.94 \times 10^4$ (51.7) |
| 75 | 125 (75.4) | 103 (75.4) | 469 (74.6) | 3898 (75.6) |
| 100 | 9 (99.6) | 7 (99.5) | 21 (100.7) | 587 (99.8) |

Example 17

This Example illustrates processing advantages at high polyimide content achievable using compositions according to the present invention. A 250-milliliter reaction flask was charged with 60.0 grams ULTEM 1010-1000 ($M_n \approx 22{,}000$ grams/mole). EPOXY RESEARCH RESIN RSL-1462 (40.0 grams) was added to the polyimide to provide a 40/60 epoxy resin/polyimide percent weight ratio. The reaction flask was fitted with a mechanical stirrer and purged with nitrogen gas. The reaction flask was heated at 190° C. for 12 hours. The polymer appeared fully dissolved into the epoxy resin; however, the product was too viscous to collect at a safe temperature.

A 250-milliliter reaction flask was charged with 60.0 grams ULTEM oligomer 1. EPOXY RESEARCH RESIN RSL-1462 (40.0 grams) was added to the oligimide to provide a 40/60 epoxy resin/oligimide weight ratio. The reaction flask was fitted with a mechanical stirrer and purged with nitrogen gas. The reaction flask was heated at 190° C. for one hour. The oligomer fully dissolved into the epoxy resin. 190° C. is a practical upper limit for processing typical epoxy resins useful for blends with polyimides.

TABLE 2

| Polymide | Imide-Containing Material (weight percent) | Process Time at 190° C. |
|---|---|---|
| ULTEM 1010-1000 (comparative) ($M_n \approx 22{,}000$ grams/mole) | 60 | 12 hours |
| ULTEM Oligomer 1 ($M_n \approx 2{,}800$ grams/mole) | 60 | 1 hour |

Example 18

This Example illustrates low temperature processing advantages achievable using compositions according to the present invention. A 250-milliliter reaction flask was charged with 20.0 grams ULTEM 1010-1000. EPOXY RESEARCH RESIN RSL-1462 (80.0 grams) was added to the epoxy resin to provide an 80/20 epoxy resin/polyimide weight ratio. The reaction flask was fitted with a mechanical stirrer and purged with nitrogen gas. The reaction flask was heated at 150° C. for 24 hours. The polymer did not fully dissolve in the epoxy resin.

A 250-milliliter reaction flask was charged with 20.0 grams ULTEM oligomer 1. EPOXY RESEARCH RESIN RSL-1462 (80.0 grams) was added to the epoxy resin to provided an 80/20 weight ratio of epoxy resin/oligimide. The reaction flask was fitted with a mechanical stirrer and purged with nitrogen gas. The reaction flask was heated at 150° C. for 35 minutes. The oligomer fully dissolved into the epoxy resin.

TABLE 3

| Polymide | Imide-Containing Material (weight percent) | Process Time at 150° C. |
|---|---|---|
| ULTEM 1010-1000 (comparative) ($M_n \approx 22{,}000$ grams/mole) | 20 | >24 hours |
| ULTEM Oligomer 1 ($M_n \approx 2{,}800$ grams/mole) | 20 | 35 minutes |

Example 19

This Example shows the use of adhesive films according to the present invention. Adhesive strength was measured using a modification of ASTM D5868-95: "Standard Test Method for Fiber Reinforced Plastic (FRP) Bonding."

The following conditions/modifications were used:

8.1.1 The test substrates were either uncoated fiber-reinforced, plastic substrates or fiber-reinforced, plastic substrates coated with a commercial solder mask.

8.1.2 The fiber-reinforced plastic parts were cut into flat coupons measuring 2.54 centimeters by 5.08 centimeters with a thickness of 2.0 millimeters.

8.2.1 The surface was prepared by wiping with heptane, followed by acetone. The test substrates were then baked at 200° C. for 30 minutes.

8.3.1 The film adhesive was nominally 0.23 millimeters thick and applied by laminating at 70° C.

8.3.2 The adhesive was cured in air at 200° C. for 30 minutes.

8.3.3 The bondline thickness was controlled to 0.20 millimeter using a 0.20-millimeter wire spacer. Binder clips were used to apply a fixturing force during cure. The lap shear overlap was 2.54 centimeters by 1.27 centimeters.

8.4.1 The testing machine was a SINTECH MODEL 30 tensile testing apparatus obtained with load cell model 3132 available from MTS Systems Corporation, Sintech Division of Cary, N.C.

8.4.2 The specimen loading rate was 0.254 millimeters/ minute.

The values reported are peak/break stress (MegaPascals) and are an average of three test samples. In all cases, the substrate, as opposed to the adhesive, failed.

TABLE 4

| Example | Adhesive Film Used | Substrate | Cured Overlap Shear Adhesion (MegaPascals) |
|---|---|---|---|
| 19a | Example 13 | FR406 laminate | 10.1 |
| 19b | Example 14 | FR406 laminate | 8.7 |
| 19c | Example 15 | FR406 laminate | 13.3 |

Accordingly, the scope of this invention should not be determined by the embodiments illustrated, but by the appended claims and their legal equivalents.

What is claimed is:

1. A hybrid adhesive composition comprising:

a) a polyimide oligomer having a molecular weight ($M_n$) of less than about 8,000 grams/mole, said oligomer having a repeating unit backbone of Formula (I):

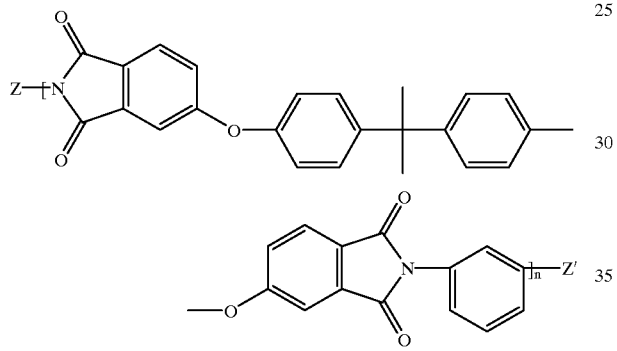

where terminal end group Z is selected from:

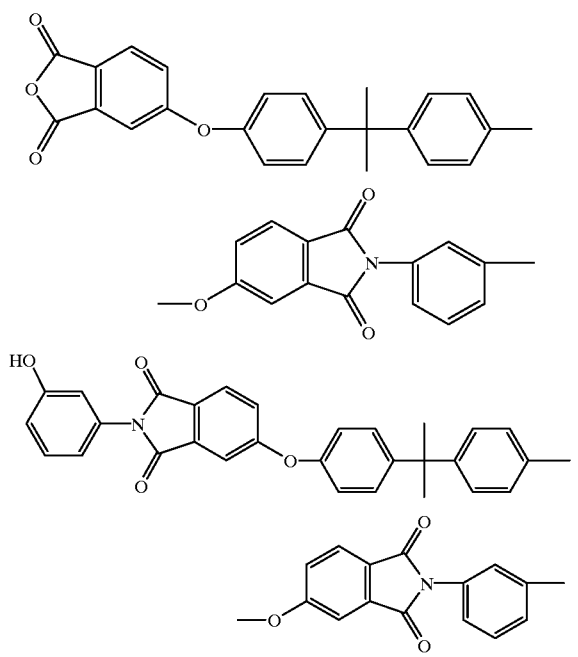

-continued

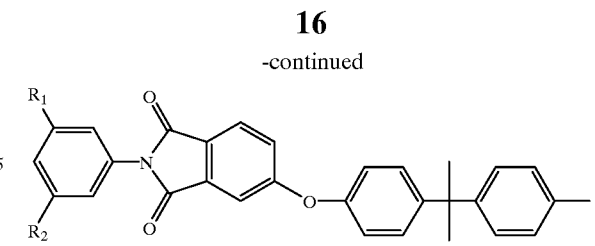

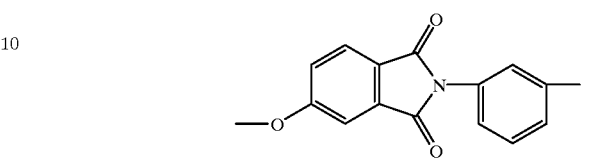

and where terminal end group Z' is selected from:

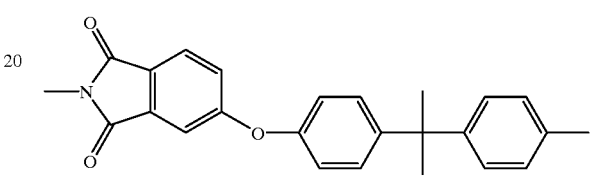

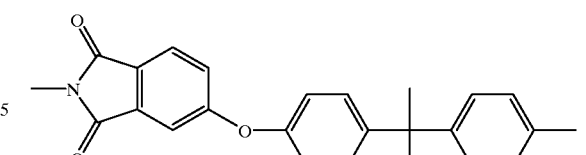

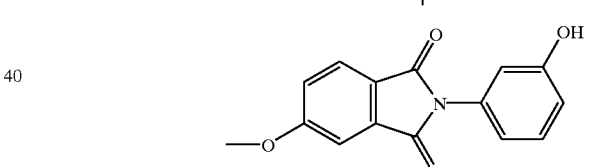

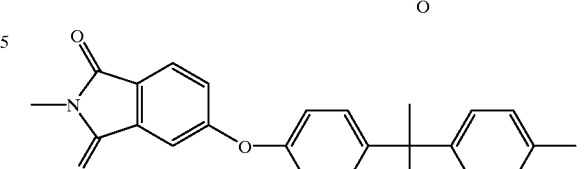

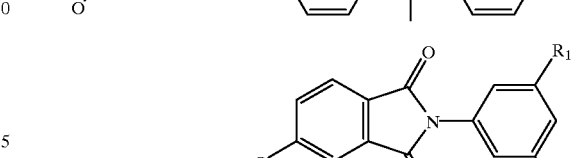

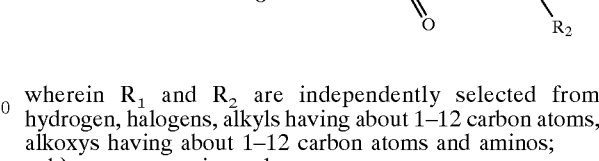

wherein $R_1$ and $R_2$ are independently selected from hydrogen, halogens, alkyls having about 1–12 carbon atoms, alkoxys having about 1–12 carbon atoms and aminos;

b) an epoxy resin; and c) an epoxy curing agent.

2. The hybrid adhesive composition of claim 1, wherein said polyimide oligomer is present in an amount of about 5 to about 60 weight percent based on total weight of the composition.

3. The hybrid adhesive composition of claim 1, wherein said epoxy resin is ionically clean.

4. The hybrid adhesive composition of claim 1, wherein said epoxy resin is an aromatic glycidyl epoxy.

5. The hybrid adhesive composition of claim 1, wherein said epoxy resin is a cycloaliphatic epoxy.

6. The hybrid adhesive composition of claim 1, wherein n in Formula I ranges from about 3 to about 6.

7. The hybrid adhesive composition of claim 1, wherein said epoxy curing agent is a thermal cationic catalyst.

8. The hybrid adhesive composition of claim 1, wherein said epoxy curing agent is a hydrazide curing agent.

9. The hybrid adhesive composition of claim 1, wherein said curing agent is an anhydride curing agent.

10. The hybrid adhesive composition of claim 1, wherein said curing agent is a photocatalyst.

11. The hybrid adhesive composition of claim 1, further comprising silica.

12. The hybrid adhesive composition of claim 1, wherein said curing agent is an anionic catalyst.

13. The hybrid adhesive composition of claim 1, further comprising electrically conductive particles.

14. A solventless process for preparing a catalytic curable hybrid adhesive composition comprising the steps of:

providing a polyimide oligomer having a molecular weight ($M_n$) of less than about 8,000 grams/mole, said oligomer having a repeating unit backbone of Formula (I):

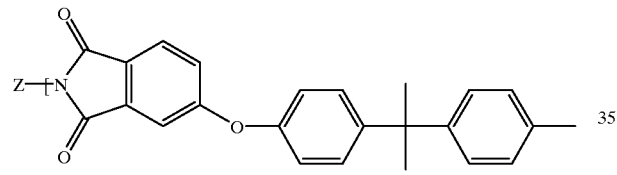

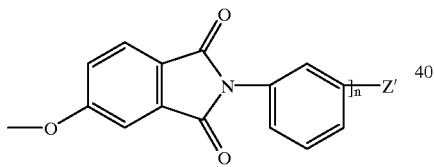

where terminal end group Z is selected from:

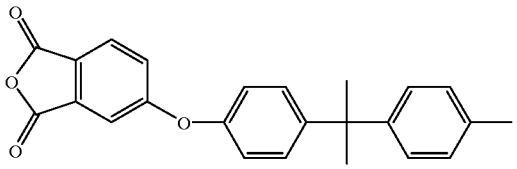

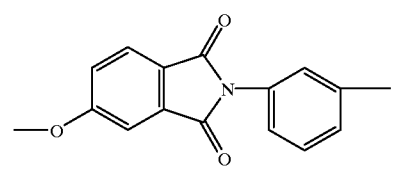

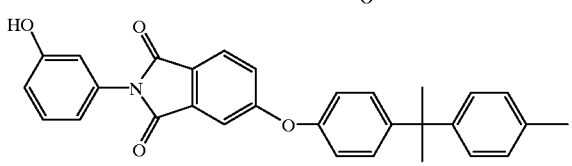

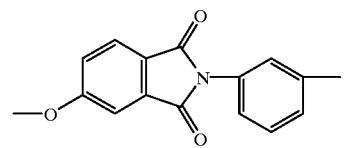

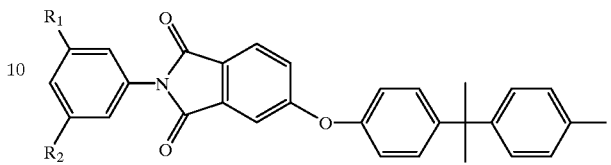

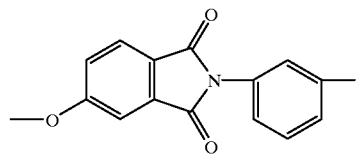

and where terminal end group Z' is selected from:

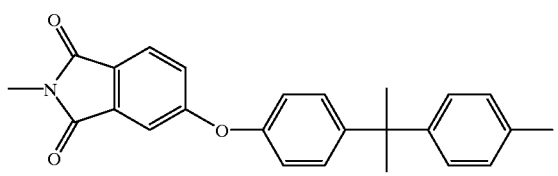

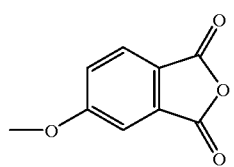

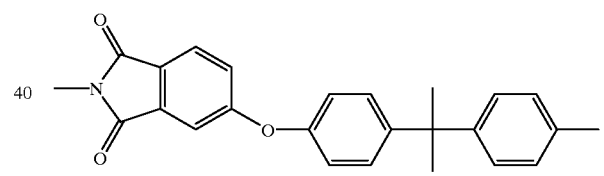

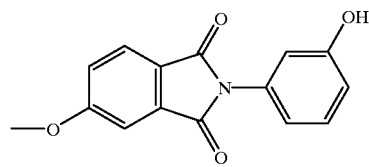

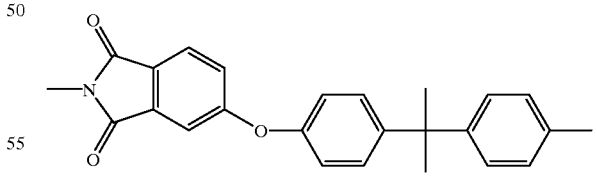

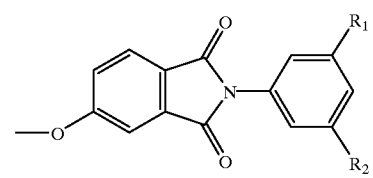

wherein $R_1$ and $R_2$ are independently selected from hydrogen, halogens, alkyls having about 1–12 carbon atoms, alkoxys having about 1–12 carbon atoms, and aminos;

providing an epoxy resin and dissolving said oligomer in said epoxy resin at an elevated temperature;

providing an epoxy curing agent; and cooling said epoxy resin and oligomer to a temperature below the activation temperature of said catalyst and blending said catalyst into said solution.

15. The process of claim 14, wherein said polyimide oligomer is present in an amount of about 5 to about 60 weight percent based on total weight of the adhesive composition.

16. The process of claim 14, wherein said elevated temperature is greater than about 120 degrees C.

17. The process of claim 14, wherein said temperature below the activation temperature of said catalyst is less than about 120 degrees C.

18. The process of claim 14, wherein said epoxy is an aromatic glycidyl epoxy.

19. The process of claim 14, wherein said epoxy is a cycloaliphatic epoxy.

20. The process of claim 14, wherein said epoxy curing agent is selected from thermal cationic catalysts, anionic catalysts, photocatalysts, anhydride curing agents, and hydrazide curing agents.

21. A thermoset adhesive composition comprising the cured reaction product of the hybrid adhesive composition of claim 1.

22. A substrate at least partially coated with the composition of claim 1.

23. A substrate at least partially coated with the composition of claim 21.

24. An electronic component comprising the composition of claim 1.

25. An electronic component comprising the composition of claim 21.

* * * * *